(12) United States Patent
Ngo

(10) Patent No.: US 6,236,247 B1
(45) Date of Patent: May 22, 2001

(54) IMPEDANCE PSEUDO-MATCHED WRITE DRIVER

(75) Inventor: Tuan V. Ngo, Eden Prairie, MN (US)

(73) Assignee: Agere Systems Guardian Corp., Allentown, PA (US)

(*) Notice: Subject to any disclaimer, the term of this patent is extended or adjusted under 35 U.S.C. 154(b) by 0 days.

(21) Appl. No.: 09/433,177

(22) Filed: Nov. 3, 1999

Related U.S. Application Data

(60) Provisional application No. 60/144,496, filed on Jul. 19, 1999.

(51) Int. Cl.[7] ............................. H03K 1/00; H03K 17/56
(52) U.S. Cl. ........................................... 327/110; 327/423
(58) Field of Search ................................ 327/110, 423, 327/108, 109, 362, 587, 588, 300, 304; 360/46, 67

(56) References Cited

U.S. PATENT DOCUMENTS 5,638,012 * 6/1997 Hashimoto et al. .................. 327/110
5,880,626 * 3/1999 Dean ..................................... 327/110
6,101,052 * 8/2000 Gooding et al. ........................ 360/46
6,121,800 * 9/2000 Leighton et al. ..................... 327/110

* cited by examiner

Primary Examiner—Toan Tran
(74) Attorney, Agent, or Firm—Kinney & Lange, P.A.

(57) ABSTRACT

An impedance matching circuit for a write driver matches the differential impedance of the winding of the write head and the transmission line to the write head. The impedance matching circuit includes a resistor connected between a node and a current switch of the write driver. The resistor has an impedance value matching the differential impedance value of the transmission line and head. During quiescent or steady state operation, the write driver provides a DC write current in a selected direction through the winding, and the resistor matches the differential impedance of the head and transmission line. During switching to reverse direction of write current through the winding, however, the resistor dampens voltage swings at the node to minimize current undershoot. Optionally, a capacitor is in parallel with the resistor to short-circuit the resistor during switching to improve the rise-time characteristics of the current reversal, but at a sacrifice of the impedance characteristics during switching.

15 Claims, 2 Drawing Sheets

IMPEDANCE PSEUDO-MATCHED WRITE DRIVER

CROSS-REFERENCE TO RELATED APPLICATION(S)

This application claims the benefit of Provisional Application No. 60/144,496 filed Jul. 19, 1999 for "Flex Impedance Pseudo-Matched Write Driver" by Tuan V. Ngo.

BACKGROUND OF THE INVENTION

Write drivers for inductive write heads of the magnetic disc drive are employed to provide write current to the head. These inductive heads record data on the magnetic media by selective reversal of magnetic flux caused by a reversal of the direction of current through the write head winding. The write current is reversed by a command from an input signal representing data to be recorded. However, the current reversal generates voltage differences across the head during the reversal period, thereby requiring the voltage to recover to a nominal level to again achieve a steady-state flow of current in the opposite direction after the reversal. The voltage fluctuations cause delay in achieving steady-state current conditions, and also cause overshoot or undershoot of the current waveform, either of which may cause "ringing".

Numerous techniques have been employed to address the problem of undershoot, ringing and delays in reaching steady-state conditions. The present invention is directed to an impedance matching circuit that matches the impedance of the write driver load, namely the impedance of the inductive head and the flex circuit connecting the head to the write driver.

BRIEF SUMMARY OF THE INVENTION

In the preferred form of the invention, an impedance matching circuit for a write driver is provided to match the differential impedance of the winding of the write head and the transmission line to the write head (i.e., the conductor assembly consisting of the flex circuit and conductors between the head and the IC embodying the write driver). The write driver includes first and second current switches arranged to supply write current through the winding of the write head in opposite directions between first and second nodes for connection to the transmission line. An input receives an input signal to selectively operating the first and second switches to direct the write current through one or the other current switch. The impedance matching circuit includes a resistor connected between each of the nodes and the respective current switch. Each resistor has an impedance value matching the impedance value of the transmission line and head. During steady state conditions, the resistor matches the differential impedance of the write head and transmission line. During switching of the write driver to reverse the direction of write current through the winding, the resistor dampens the voltage swing at the nodes to minimize current undershoot and ringing.

In a second embodiment, the impedance matching circuit includes a frequency-responsive impedance device (such as a capacitor) connected to the node and in parallel with the respective resistor. The frequency-responsive impedance device has a high impedance value to DC signals and a low impedance value to AC signals to short-circuit the resistor during switching. During quiescent or steady state operation, the write driver provides a DC write current in a selected direction through the winding so the frequency-responsive impedance device does not affect operation of the circuit. During switching to reverse direction of write current through the winding, however, the write driver generates an AC transient signal, causing the frequency-responsive impedance device to short-circuit the resistor to improve rise-time characteristics of the current reversal.

In both embodiments, the write driver optionally includes third and fourth current switches coupled to the respective first and second nodes and a control circuit has first and second semiconductor devices responsive to the input signal to selectively operate the first and second current switches. The arrangement of the current switches and control circuit is such that write current is directed through the first and fourth current switches to direct write current through the winding in one direction, and is directed through the second and third current switches to direct write current through the winding in an opposite direction. The impedance matching circuit further includes a resistor connected to each of the first and second semiconductor devices of the control circuit, with each resistor having an impedance value matching the impedance value of the transmission line and head. In this optional feature, frequency-responsive impedance devices, such as capacitors, may be included in parallel with the resistors to improve rise-time characteristics.

DETAILED DESCRIPTION

Figure 1:
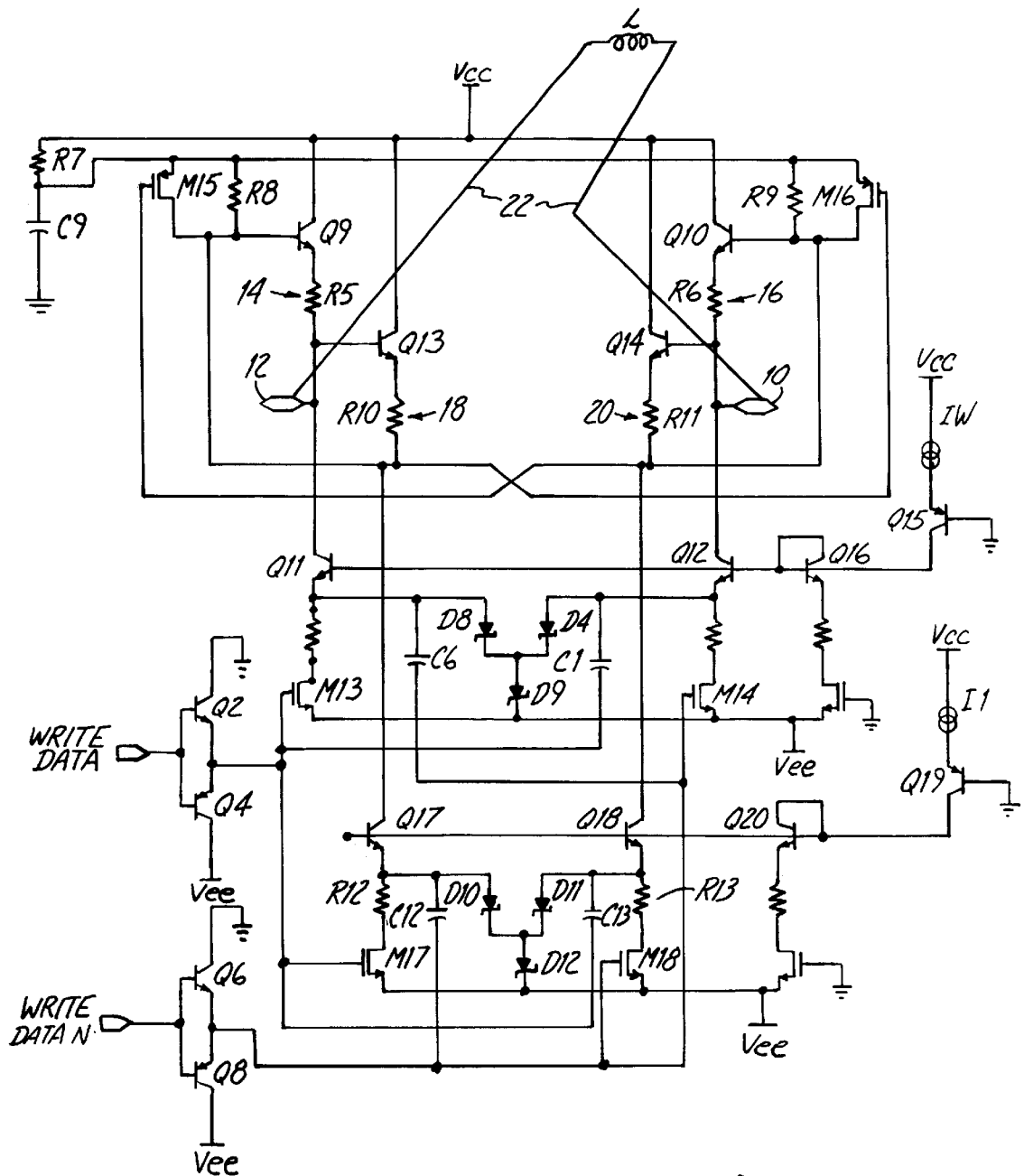
FIG. 1 is a circuit diagram of a write driver having an impedance matching circuit according to the presently-preferred embodiment of the present invention.

FIG. 1 illustrates a current mode write driver having an impedance matching circuit according to the presently preferred embodiment of the present invention. The write driver comprises an H-switch consisting of upper NPN transistors Q9 and Q10 and lower NPN transistors Q11 and Q12 coupled with MOSFETs M13 and M14, respectively. A source of write current IW is input through transistor Q15 and mirrored by current mirror generator Q16 to transistors Q11 and Q12. A first impedance matching circuit 14 comprising resistor R5 is coupled between the emitter of transistor Q9 and node 12, and a second impedance matching circuit 16 comprising resistor R6 is coupled between emitter of transistor Q10 and node 10. The resistances of resistors R6 and R6 match the impedance of head L and transmission line 22, connected to nodes 10 and 12.

An upper H-switch control circuit includes NPN transistors Q13 and Q14, MOSFETs M15 and M16, resistors R7, R8 and R9 and capacitor C9. The bases of transistors Q13 and Q14 are connected to respective nodes 12 and 10. The emitter of transistor Q13 is connected through impedance matching circuit 18, comprising resistor RIO, to the source of MOSFET M15 and the gate of MOSFET M16, and the emitter of transistor Q14 is connected through impedance matching circuit 20, comprising resistor RI 1, to the source of MOSFET M16 and the gate of MOSFET M15. Resistors R8 and R9 are connected across MOSFETs M15 and M16, and the sources of MOSFETs M15 and M16 are connected to the bases of transistors Q9 and Q10. The drains of MOSFETs M15 and M16 are connected to the junction between capacitor C9 and resistor R7, the opposite side of resistor R7 being connected to Vcc and the opposite side of capacitor C9 being connected to Vee. A source of control current I1 is input through transistor Q19 and mirrored by current mirror generator Q20 to transistors Q17 and Q18. Transistors Q17 and Q18 have their collectors coupled through respective impedance matching circuits 18 and 20 to the emitters of transistors Q13 and Q14 of the upper H-switch control, and their emitters are coupled through resistors R12 and R13 to MOSFETs M17 and M18. The gate of MOSFET M17 is coupled to a buffer consisting of transistors Q2 and Q4 and the gate of MOSFET M18 is coupled to a buffer of transistors Q6 and Q8. When MOSFET M17 is conducting, current is mirrored through transistor Q17 and when MOSFET M18 is operated current is mirrored through transistor Q18. Operation of the upper H-switch control is more fully explained in application Ser. No. 09/292,502, filed on Apr. 15, 1999, for "Write Driver Circuit Having Programmable Overshoot and Undershoot" by John J. Price Jr. and Donald J. Schulte and assigned to the same assignee as the present application.

Voltage boosting circuits comprise a pair of buffers formed of transistors Q2, Q4, Q6 and Q8, capacitors C1, C6, C12 and C13, and Schottky diodes D4, D8, D89, D10, D11 and D12. The boosting circuits are connected to the emitters of lower switches Q11 and Q12 of the H-switch, and to the junctions of the sources of MOSFETs M15 and M16 and gates of MOSFETs M16 and M15 of the upper switch control circuit. The boosting circuits serve to boost the voltages at nodes 10 and 12 and at the junctions in the switch control circuit during the reversal of direction of current through head L due to a change in the state of the Write_Data and Write_Data_N signals. Operation of the voltage boosting circuits is more fully explained in application Ser. No. 09/432,951 filed on even date herewith, for "Voltage Boosting Circuit for Write Drivers" by John D. Leighton and Tuan V. Ngo and assigned to the same assignee as the present application.

In operation of the circuit, when MOSFET M13 and transistor Q10 are operated to conduction, write current IW mirrored into transistor Q11 flows through the winding connected to nodes 10 and 12 from source Vcc, through transistor Q10, through the winding in the direction from node 10 to node 12, through transistor mirror Q11 and MOSFET M13 to source Vee. Conversely, when MOSFET M14 and transistor Q9 are operated to conduction, write current mirrored into transistor Q12 flows from source Vcc through transistor Q9, winding L in the direction from node 12 to node 10, through transistor mirror Q12 and MOSFET M14 to source Vee. The gates of MOSFETs M13 and M14 are connected to different ones of the buffers consisting of transistors Q2 and Q4 and Q6 and Q8. Likewise, the gates of MOSFETs M17 and M18 are connected to opposite ones of the buffers of transistors Q2 and Q4 and transistors Q6 and Q8 to operate the upper H-switch control to effectuate operation of the respective transistors Q9 and Q10. The buffer comprising transistors Q2 and Q4 is connected to the Write_Data input and the buffer comprising transistors Q6 and Q8 is connected to the Write_Data_N input. The data signals received at the Write_Data and Write_Data_N inputs are complementary so that when one is switched to a high state the other is switched to a low state. Transistors Q9 and Q10 and MOSFETs M13 and M14 respond to the switching of states to reverse the direction of write current through head L.

Typically, the inductive write heads of a magnetic disk drive are mounted to the distal end of one or more actuator arms of a rotatable E-block and are connected to the write driver circuit by a connector assembly forming a transmission line. Conventionally, the write driver circuit is part of an integrated circuit mounted to the disk drive housing, and the conductor assembly includes a flexible cable connected between the integrated circuit and electrical conductors supported by the rotatable E-block. The electrical conductors extend along the actuator arms and terminate at the heads. Thus, as shown in the FIG. 1, inductive head L is electrically connected through transmission line 22, which electrically represents the conductor assembly of the flexible cable and conductors, to nodes 10 and 12 of the write driver.

Resistors R5, R6, R10 and R11 of impedance matching circuits 14, 16, 18 and 20 are selected to match the differential impedance, as opposed to common mode impedance, of transmission line 22 and head L. Thus, if the sum of the DC impedance of the transmission line, consisting of both conductors and the flexible cable, and of head L is 72 Ω, each of resistors R5, R6, R10 and R11 has a resistance of 72 Ω. Thus, the sum of the differential impedances of transmission line 22 and head L is matched by one or the other of resistors R5 and R6 in the H-switch and one or the other of resistors R10 and R11 in the control circuit.

Operation of the impedance matching resistors during switching can be explained by considering first the operation of the circuit without the voltage boosting circuit of the aforementioned Leighton and Ngo application and without shorting capacitors C7, C8, C10 and C11 as subsequently shown in FIG. 2. During quiescent or steady state conditions, and assuming transistor Q9 and MOSFET M14 are conducting and transistors Q10 and MOSFET M13 are non-conducting, steady state DC write current flows from node 12 to node 10 though transmission line 22 and head L. Under these conditions, the voltage at node 12 is Vcc minus one diode drop of transistor Q9 ($V_D$) and minus the voltage drop across resistor R5 ($V_R$), and the voltage at node 10 equals that at node 12 minus the resistance of transmission line 22 and head L (which equals that of resistor R5). Hence, the voltage at node 12 is VCC-$V_D$-$V_R$ and the voltage at node 10 is Vcc-$V_D$-2$V_R$. Upon switching, transistor Q9 becomes non-conduction and transistor Q10 becomes conducting. The voltage at node 12 drops to near Vee due to conduction of MOSFET M13, while the voltage at the emitter of transistor Q10 rises VCC-$V_D$ due to conduction of transistor Q10. Initially, however, the current still flows from node 12 to node 10, causing the voltage at node 10 to rise to VCC-$V_D$-$V_R$, leaving a voltage drop across resistor R6 of $V_R$. The high voltage across the nodes causes a reversal in the direction of current between the nodes. The reversed current will increase the voltage at node 12. Without correction techniques, parasitic capacitances associated with the current switches tend to force the value of the reversed current to exceed quiescent or steady state values causing overshoot of the current level. Overshoot of the current level tends to force the voltage at node 12 to a level greater than the quiescent level of VCC-$V_D$-2$V_R$ which would lead to undershoot of the current, and current ringing. However, as the voltage at node 12 tends to exceed the quiescent level of VCC-$V_D$-2$V_R$, the voltage is dampened across resistor R6, transmission line 22 and head L, leading to smaller increases of voltage levels over the quiescent level and minimization of undershoot.

The voltage boost circuit of the aforementioned Leighton and Ngo application, permits the voltage levels at the nodes to recover even more quickly, resulting in minimization of current ringing, as explained in that application.

Figure 2:
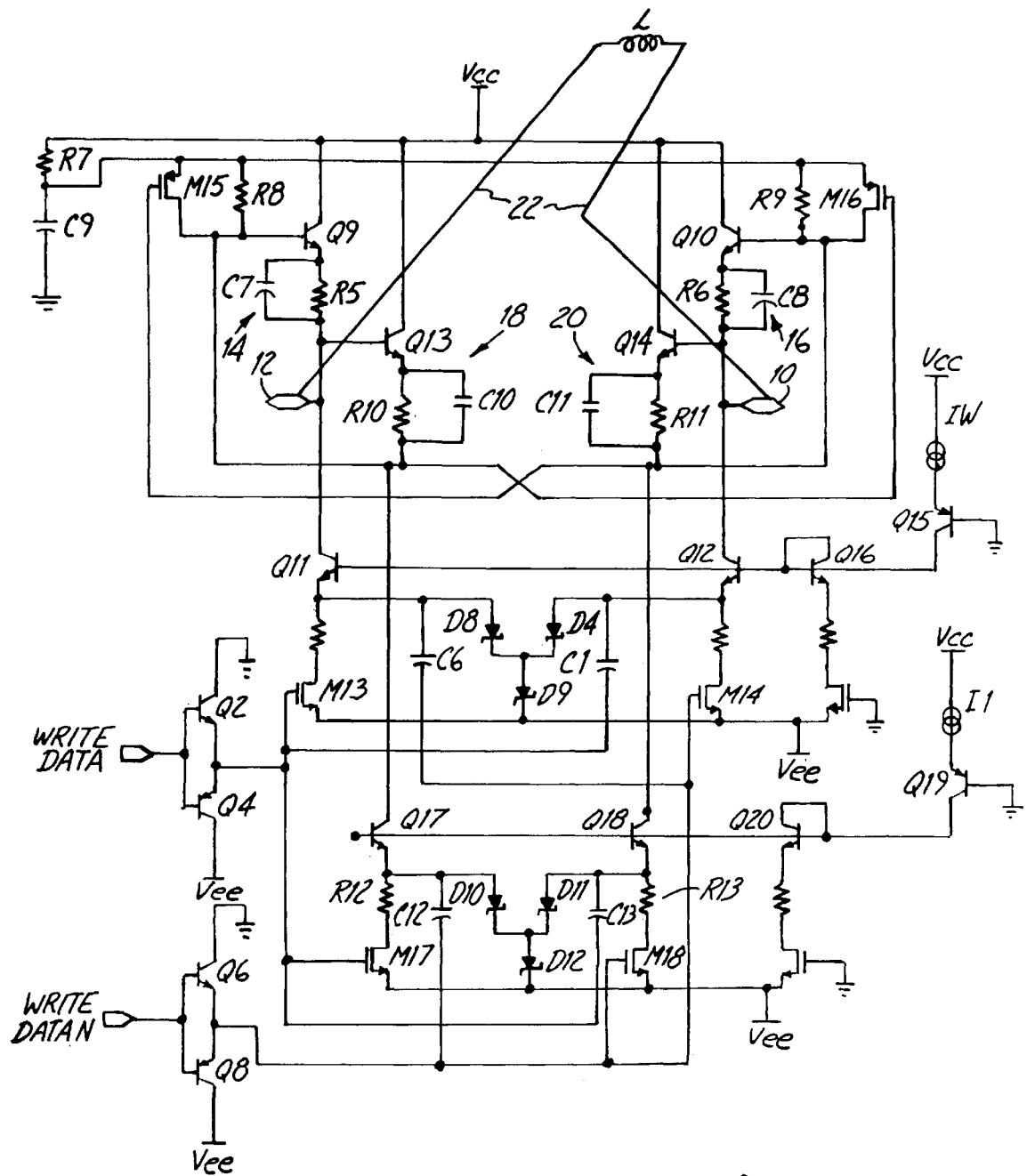
FIG. 2 is a circuit diagram of a write driver having an impedance matching circuit according to a modification of the present invention.

FIG. 2 illustrates a modification of the present invention in which the impedance matching circuits 14, 16, 18 and 20 include capacitors C7, C8, C10 and C11 in parallel with respective resistors R5, R6, R10 and R11. Parallel capacitors C7, C8, C10 and C11 are selected to provide low impedance to high frequency AC signals to short-circuit resistors R5, R6, R10 and R11 during switching of the H-switch. During steady state or quiescent conditions, direct current flows through the nodes. Since the steady state write current is DC, capacitors C7, C8, C10 and C11 are electrically inconsequential, and resistors R5, R6, R10 and R11 provide impedance matching as described above. During switching, however, upon a reversal of states of the data signals at the Write_Data and Write_Data_N inputs, the change in states of transistors Q9–Q12 generates a high transient AC voltage at one of nodes 10 and 12. Capacitors C7, C8, C10 and C11 in parallel with respective resistors R5, R6, R10 and R11 short circuit the resistors during current reversal. More particularly, the high frequency transient signals associated with switching the states of the H-switch to reverse the direction of write current through head L are short-circuited through respective capacitors C7, C8, C10 and C11 so that no voltage drop appears across respective resistors R5, R6, R10 and R11. As a result there is no head room limitation during switching. As the write current direction reverses and recovers, the short-circuit provided by the capacitors removes and resistors R5, R6, R10 and R11 match the impedance of the conductors 22 to minimize undershoot and associated ringing.

The capacitors improve the rise-time characteristics of the circuit by short-circuiting the impedance matching resistors to place a greater voltage drop across the nodes during switching. The greater voltage drop forces the current to reverse more quickly, thereby shortening the rise time of the current reversal. However, the shorting of the resistors alters the impedance characteristics of the circuit and reduces the dampening effect during current reversal, increasing the likelihood of undershoot, and hence ringing, during switching of the H-switch.

Although the present invention has been described with reference to preferred embodiments, workers skilled in the art will recognize that changes may be made in form and detail without departing from the spirit and scope of the invention. Particularly, while the invention is described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices.

What is claimed is:

1. A write driver having first and second nodes for connection to a conductor assembly that is connected to opposite sides of a winding of a write head, the write driver comprising:

a first current switch coupled to the first node;

a second current switch coupled to the second node;

an input responsive to an input signal for selectively operating the first and second switches to direct a substantially DC write current through the winding in respective first and second directions;

a first impedance matching circuit connected between the first node and the first current switch, the first impedance matching circuit including a first resistor having an impedance value substantially matching an impedance value of the conductor assembly including the write head; and a second impedance matching circuit connected between the second node and the second current switch, the second impedance matching circuit including a second resistor having an impedance value substantially matching an impedance value of the conductor assembly including the write head.

2. The write driver of claim 1, wherein the write driver generates AC transient signals during operation of the first and second current switches to reverse direction of the write current, the first impedance matching circuit further including a first frequency-responsive impedance device having a high impedance value to DC signals and a lower impedance value to AC signals, the first impedance device being connected in parallel to the first resistor and responsive to the AC transient signals to short-circuit the first resistor, the first impedance device being responsive to the write current during steady state operation of the first and second current switches to permit the first resistor to substantially match an impedance value of the conductor assembly including the write head, and the second impedance matching circuit further including a second frequency-responsive impedance device having a high impedance value to DC signals and a lower impedance value to AC signals, the second impedance device being connected in parallel to the second resistor and responsive to the AC transient signals to short-circuit the second resistor, the second impedance device being responsive to the write current during steady state operation of the first and second current switches to permit the second resistor to substantially match an impedance value of the conductor assembly including the write head.

3. The write driver of claim 2, wherein the first and second impedance devices are capacitors.

4. The write driver of claim 1, wherein the write driver further includes a third current switch coupled to the first node, a fourth current switch coupled to the second node, the input being responsive to the input signal for operating the first and fourth current switches to direct write current through the winding in the first direction and for operating the second and third current switches to direct write current through the winding in the second direction opposite the first direction, a control circuit having a first semiconductor device responsive to the input to operate the first current switch and a second semiconductor device responsive to the input to operate the second current switch, a third impedance matching circuit connected to the first semiconductor device, the third impedance matching circuit including a third resistor having an impedance value substantially matching an impedance value of the conductor assembly including the write head, and a fourth impedance matching circuit connected to the second semiconductor device, the fourth impedance matching circuit including a fourth resistor having an impedance value substantially matching an impedance value of the conductor assembly including the write head.

5. The write driver of claim 4, wherein the write driver generates AC transient signals during operation of the first and second current switches to reverse direction of the write current, the first impedance matching circuit further including a first frequency-responsive impedance device having a high impedance value to DC signals and a lower impedance value to AC signals, the first impedance device being connected in parallel to the first resistor and responsive to the AC transient signals to short-circuit the first resistor, the first impedance device being responsive to the write current during steady state operation of the first and second current switches to permit the first resistor to substantially match an impedance value of the conductor assembly including the write head, the second impedance matching circuit further including a second frequency-responsive impedance device having a high impedance value to DC signals and a lower impedance value to AC signals, the second impedance device being connected in parallel to the second resistor and responsive to the AC transient signals to short-circuit the second resistor, the second impedance device being responsive to the write current during steady state operation of the first and second current switches to permit the second resistor to substantially match an impedance value of the conductor assembly including the write head, the third impedance matching circuit further including a third frequency-responsive impedance device having a high impedance value to DC signals and a lower impedance value to AC signals, the third impedance device being connected in parallel to the third resistor and responsive to the AC transient signals to short-circuit the third resistor, the third impedance device being responsive to the write current during steady state operation of the first and second current switches to permit the third resistor to substantially match an impedance value of the conductor assembly including the write head, and the fourth impedance matching circuit further including a fourth frequency-responsive impedance device having a high impedance value to DC signals and a lower impedance value to AC signals, the fourth impedance device being connected in parallel to the fourth resistor and responsive to the AC transient signals to short-circuit the fourth resistor, the fourth impedance device being responsive to the write current during steady state operation of the first and second current switches to permit the fourth resistor to substantially match an impedance value of the conductor assembly including the write head.

6. The write driver of claim 5, wherein the first, second, third and fourth impedance devices are capacitors.

7. A write driver having first and second nodes for connection to a conductor assembly that is connected to opposite sides of a winding of a write head, the write driver being operable to selectively provide a substantially DC write current in opposite directions through the winding, the write driver generating an AC transient signal during operation of the write driver to reverse direction of write current through the winding, the conductor assembly having an impedance value, and an impedance matching circuit connected to at least the first node for matching the impedance value of at least the conductor assembly, the impedance matching circuit comprising:

a resistor connected to the first node, the resistor having an impedance value matching an impedance value of at least the conductor assembly, and a frequency-responsive impedance device having a high impedance value to DC signals and a lower impedance value to AC signals, the impedance device being connected in parallel to the resistor and responsive to the AC transient signals to short-circuit the resistor, the impedance device being responsive to the write current during steady state operation of the write driver to permit the resistor to match an impedance value of at least the conductor assembly.

8. The write driver of claim 7, further including a first current switch arranged to supply write current through the winding of the write head in a first direction between the first and second nodes, a second current switch arranged to supply write current through the winding of the write head in a second direction between the first and second nodes opposite the first direction, an input responsive to an input signal for selectively operating the first and second switches to direct a substantially DC write current through the winding in respective first and second opposite directions, the impedance matching circuit includes the first named resistor and parallel first-named impedance device connected between the first node and a first current switch and further includes a second resistor connected to the first node, the second resistor having an impedance value matching the impedance value of at least the conductor assembly, and a second frequency-responsive impedance device having a high impedance value to DC signals and a low impedance value to AC signals, the second impedance device being connected in parallel to the second resistor and responsive to the AC transient signals to short-circuit the second resistor, the second impedance device being responsive to the write current during steady state operation of the write driver to permit the second resistor to match the impedance value of at least the conductor assembly.

9. The write driver of claim 8, wherein the first and second impedance devices are capacitors.

10. The write driver of claim 9, wherein each of the first and second resistors has an impedance value matching the sum of the differential impedance values of the conductor assembly and the winding of the write head.

11. The write driver of claim 8, wherein the write driver further includes a third current switch coupled to the first node and a fourth current switch coupled to the second node, the input being responsive to the input signal for operating the first and fourth current switches to direct write current through the winding in the first direction and for operating the second and third current switches to direct write current through the winding in the second direction opposite the first direction, and a control circuit having a first semiconductor device responsive to the input to operate the first current switch and a second semiconductor device responsive to the input to operate the second current switch, the impedance matching circuit further comprising a third resistor connected to the first semiconductor device, the third resistor having an impedance value matching the impedance value of at least the conductor assembly, and a third frequency-responsive impedance device having a high impedance value to DC signals and a low impedance value to AC signals, the third impedance device being connected in parallel to the third resistor and responsive to the AC transient signals to short-circuit the third resistor, the third impedance device being responsive to the write current during steady state operation of the write driver to permit the third resistor to match the impedance value of at least the conductor assembly, and a fourth resistor connected to the second semiconductor device, the fourth resistor having an impedance value matching the impedance value of at least the conductor assembly, and a fourth frequency-responsive impedance device having a high impedance value to DC signals and a low impedance value to AC signals, the fourth impedance device being connected in parallel to the fourth resistor and responsive to the AC transient signals to short-circuit the fourth resistor, the fourth impedance device being responsive to the write current during steady state operation of the write driver to permit the fourth resistor to match the impedance value of at least the conductor assembly.

12. The write driver of claim 11, wherein the first, second, third and fourth impedance devices are capacitors.

13. The write driver of claim 12, wherein each of the first, second, third and fourth resistors has an impedance value matching the sum of the differential impedance values of the conductor assembly and the winding of the write head.

14. The write driver of claim 7, wherein the impedance device is a capacitor.

15. The write driver of claim 14, wherein the resistor has an impedance value matching the sum of the differential impedance values of the conductor assembly and the winding of the write head.

* * * * *